Dec. 2, 1969   L. C. ROLL   3,481,420
LIFT TRUCK MOTOR MOUNTING
Filed Sept. 18, 1967   3 Sheets-Sheet 1

INVENTOR.
LOUIS C. ROLL
BY
*Grayer & Toolely*
ATTORNEYS

United States Patent Office 3,481,420
Patented Dec. 2, 1969

3,481,420
LIFT TRUCK MOTOR MOUNTING
Louis C. Roll, Philadelphia, Pa., assignor to Eaton Yale
& Towne Inc., Cleveland, Ohio, a corporation of Ohio
Filed Sept. 18, 1967, Ser. No. 668,520
Int. Cl. B60k 1/00
U.S. Cl. 180—65                               1 Claim

ABSTRACT OF THE DISCLOSURE

Drive motor mounting for industrial lift trucks of the heavy capacity electric ram type, wherein the motor is located in its operating position in the strategic central part of the interior space of the frame between the battery pack, located at the rear, and the forwardly mounted drive wheel units. By means of hinged mounting plates and a quick disconnect coupling, the drive motors can be swung out to an inoperative position for ready inspection and servicing.

---

This invention relates to industrial lift trucks of the electrically powered type, and more specifically of the heavy capacity electric ram type; and more particularly to a unique drive motor mounting for a compact truck of the class described.

THE PROBLEM

At the outset, it is to be understood that the exemplary background for the present invention is the class of heavy capacity electric ram trucks of the 30,000 to 50,000 pound class.

Industrial lift trucks of this class customarily have a rather long frame with a battery pack at the rear end, over the steering wheels, and with an extremely heavy load elevating carriage mounted at the front end over a heavy duty drive wheel unit.

The load elevating carriage, for lifting movement of a load, is mounted for vertical movement on uprights at the front of the vehicle. In heavy trucks of this class, the load elevating carriage is a very heavy mass comprising one or more heavy forged steel arms that extend horizontally and forwardly from the front of the truck, just in front of the driving wheels. The heavy forged steel arm or arms and the remaining very substantial mass of the load elevating carriage places a great weight on and ahead of the front wheels of the truck, and unless this weight is carefully counterbalanced, it will tend to unbalance the truck and cause it to tip forwardly under extremes of loading.

In order to properly balance the truck, it has been one common practice to "bury" the drive motors relatively deep centrally of the interior space of the frame between the battery pack and the forwardly mounted drive units. This means that the frame has to be extended in length to provide sufficient narrowness at the rear for maneuverability. The longer frame length, however, reduces the short radius maneuverability of the truck, which is a definite drawback when operating in industrial plants where space is often cramped.

A further drawback is that by burying the drive motor in a rear central portion of the frame, it is rendered most inaccessible for servicing. Thus, in industrial lift trucks of this class, the problems of inspection and service become highly complicated.

Because trucks of the particular class must be made more compact with greater load capacity, and because they must be equipped with numerous power devices and control mechanisms, it is obvious that it is extremely difficult to mount the power devices and control mechanisms in the available space in a shortened frame heavy duty truck. Further, it is extremely difficult to maintain the power devices and control mechanisms so that they may be serviced.

It is therefore obvious that a substantial advance to the art would be provided by a novel drive motor mounting means whereby the motor is located in the strategic central part of the frame, thus extended back and outward and close to the trail wheels to permit the narrow and shortened frame vehicle and yet achieve accessability.

Objects therefore of the present invention are to provide in a heavy duty lift truck of the class described, a unique drive motor mounting that provides for ready swing out access for inspection and servicing, but wherein the drive motor is located in the strategic central portion of the frame for truck compactness and high maneuverability.

As a feature of my invention, I mount the traction motor in such a novel manner that it can be readily moved from an operable "buried" position, to an inoperable, swing out inspection and servicing position, and then restored to the operable position with a minimum of manipulation of parts.

As a more particular feature of my invention, I mount a traction motor on a motor support bracket, the arrangement being such that the motor can be readily disconnected from the traction mechanism, and then be swung together with its bracket to an outside, accessible service position, preferably through an opening in the frame of the truck that is normally maintained closed.

Figure 1:
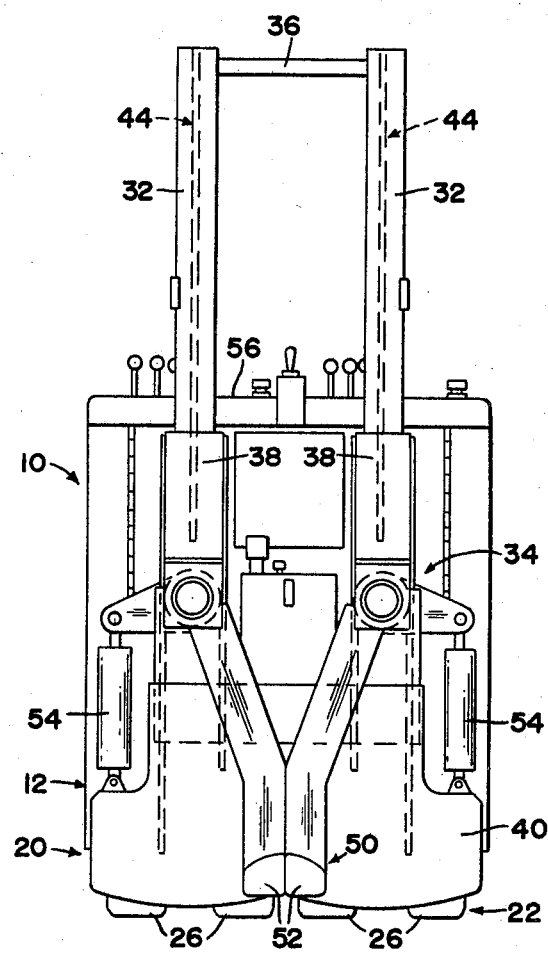
FIGURE 1 is a front elevational view of a heavy capacity electric ram truck incorporating the constructional features of the present invention.

Referring now to the drawings, the reference numeral 10 represents a truck generally of the class to which the present invention is applicable. The truck 10 comprises a frame 12 made up of massive steel side plates 14. To satisfy the industry demands for super-heavy frame construction to overcome abuse, a tank-like frame structure 12 is employed. The battery pack is mounted at the back, as indicated by numeral 16, over the steerable wheels 18.

It is a feature of this particular truck that efficient operation and good maneuverability have been accomplished by the use of power steering at the rear steerable wheels 18. Hydraulic cylinder mechanism, not shown, bridging the rear wheels 18 accomplishes this result.

The wheels 18 are mounted on tapered roller bearings on which each wheel is free to turn independently of the other, reducing scuffing to a minimum, when turning the wheels with the truck stationary or when operating at slow speeds. Each pair of wheels 18 is mounted on a large caster frame supported for rotation in a large heavy capacity thrust bearing. The steering unit articulates about a heavy hardened steel pin located along the center line axis of the truck 10, assuring ground contact with uneven floors.

At the front of the frame 12 a very heavy duty drive mechanism 20 is utilized, comprising two dual drive wheel units 22 with external brake cylinders 24 and external brake adjusters for servicing access. The drive units 22, to illustrate the heavy duty construction, comprises four 36 x 12" polyurethane tires 26, and a width over the wheel guards of 74". Combine this width with wheel bases of 90", 95" and 100" and turning radii of 136", 141" and 146", one can readily see that a 25–30% increase in capacity is provided with a 25–30% reduction in size. Through this achievement, the turning radius is now comparable with trucks of much smaller capacity.

Relative to the drive units 22, stability and safety are provided. Two individual drive units 22 are used with each wheel group articulating independently about a large diameter hardened steel shaft mounted on hardened steel bushings, insuring proper ground contact at all times for stability and safety. The articulating pins are located directly between the two hoist cylinders 28 where load is imposed thereby eliminating all overhang forces on wearing points, and thereby greatly increasing the life of the drive units 22.

To the rear of the dual drive wheel units 22 are located the drive motors 30, mounted in accordance with this invention. More will be made of this later after the other environmental details of the truck 10 are here summarized.

The frame 12, as mentioned, is composed of heavy plate and bar steel, welded into a unit structure of great strength, able to withstand bumping or other severe operating conditions. Further, strength is added to the design by welding the mast uprights 32, for the box sectioned load lifting ram carriage 34, to the frame 12, directly over the driving wheels 26, thereby reducing overhang and resultant stresses in the frame. At the top, the uprights 32 are bridged by a suitable cross beam 36.

The ram carriage 34 comprises spaced double walled box side sections 38, bridged by a thick front plate 40. The side sections 38 carry rollers 42, movable within the channel sections 44 of the uprights 32.

Lifting the 8 roller ram carriage 34 is achieved by the heavy duty, two-stage hydraulic cylinders 28, two in number. These are each anchored at their lower ends to the drive unit support by a pivot pin 46, FIGURE 2, allowing backward or forward motion for alignment with the hydraulic ram carriage 34 as it moves up and down the uprights 32. The hoist cylinders 28 are located directly above the front drive mechanism 20 where loads should be imposed, thereby eliminating all overhanging forces. Chains and sprockets have been eliminated by anchoring the hoist cylinder rod ends directly to the ram carriage 34, as at 48. The hoist cylinders 28 are each directly in front of an upright 32 and in vertical alignment therewith. This unique arrangement provides spreading of the hoist cylinders and excellent visibility between the spaced uprights 32 for spotting the ram 50 when entering coils of steel or traveling in congested areas.

To the double walled side sections 38 of the ram carriage 34 are pivotally mounted load engaging ram arms 52. Hydraulic cylinders 54 are connected between the upper terminal ends of the ram arms 52 and the front transverse plate 40 of the ram carriage 34. By this arrangement, the pivotally mounted load-engaging ram arms 52 can be held together for entering a single coil of steel—or can be spread apart thereby permitting two coils to be carried at the same time. In summary, the load ram 50 is of the split variety and uses two large hydraulic cylinders 54 for opening and closing the ram arms 52, permitting one or two coil loads to be carried at the same time.

Figure 2:
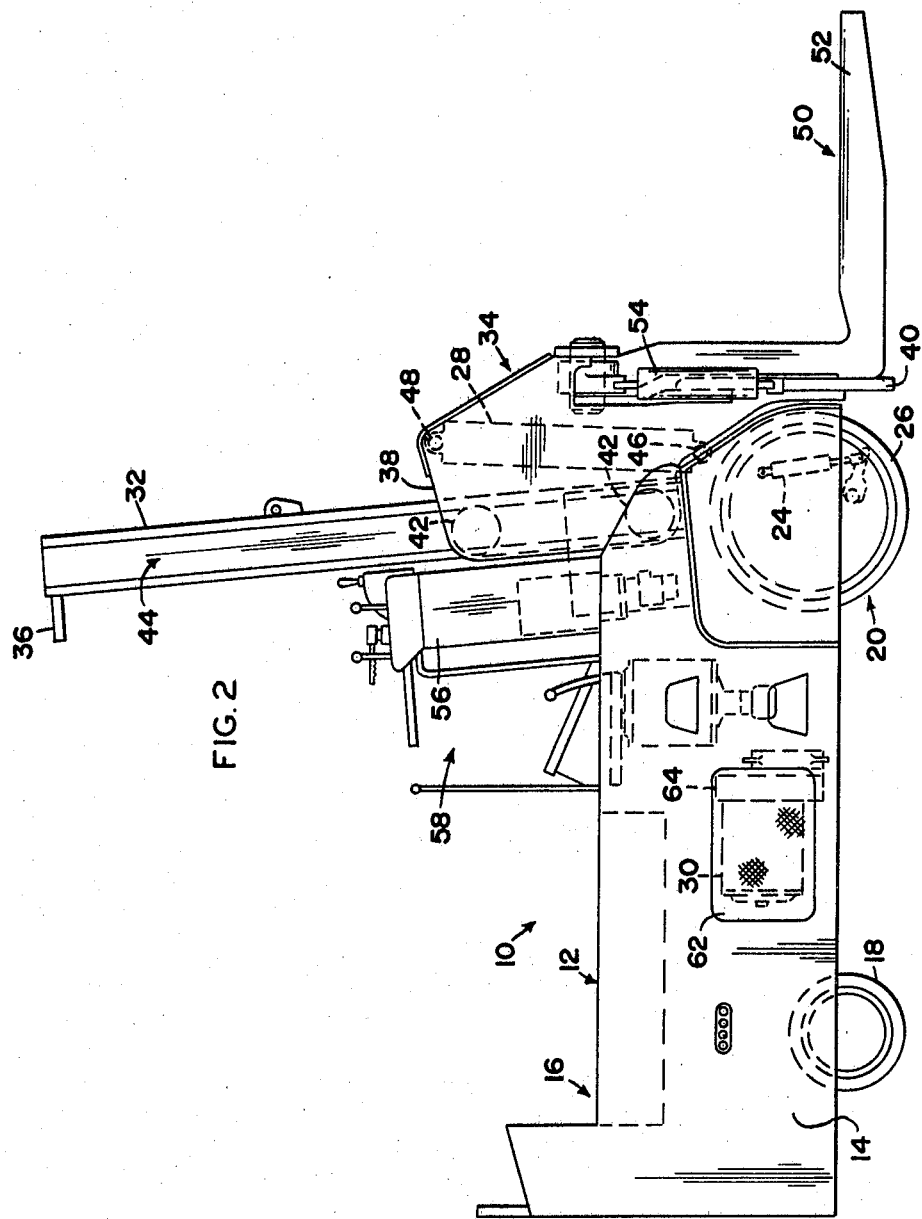
FIGURE 2 is a side elevational view of the truck of FIGURE 1, illustrating the mounting position for the drive motors, in accordance with this invention.
Figure 3:
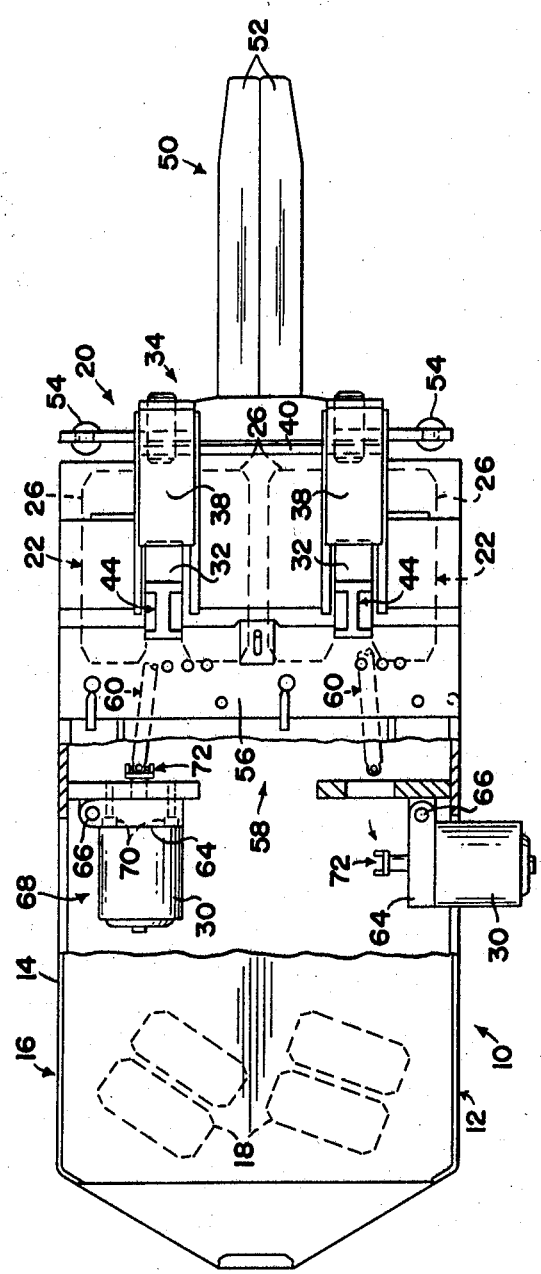
FIGURE 3 is a top plan view of the truck of FIGURES 1 and 2, showing one of the drive motors in an operative position, and the other drive motor in an inoperative swing out, accessible inspection and service position.

As shown in FIGURES 2 and 3, a magnetic control panel 56 is located immediately behind the uprights 32, which support the ram carriage 34. Also, as shown in FIGURES 2 and 3, the operator's position 58 is immediately behind the magnetic control panel 56.

It might be mentioned that dual drive, hoist, steering and hydraulic ram controls permit operation from any position across the operator's compartment 58. Each steering handle is equipped with a follow up control so that the handle and steering wheels move together, a safety guide when starting the truck in a congested area. Hydraulic operation gives ease of steering as only slight pressure is required on a handle to maneuver the truck. The electric and brake controls are interlocked to cut off power and apply brakes automatically when the operator leaves the truck. Power cannot be resumed until all controls are returned to neutral. A key switch lock out controls the circuit which makes the truck inoperative to all unauthorized personnel.

It will be evident from the foregoing that the truck in which the present invention is incorporated has very trim and compact lines for its large size and big load capacity. The side plates are of super 2 and ½" thickness and with the four 12 x 36" polyurethane tires provide turning radii which can now be associated with trucks of much smaller capacity.

Picture window visibility is also provided. Maximum visibility has been accomplished by placing the operator 56" off the floor where vision both fore and aft is excellent and necessary for driving in both directions. The two hoist cylinders 28 have been located in a normally void, unused area between each pair of carriage side arms 38 which are of box section and in front of the I-beam masts or uprights 32. The carriage 34 thus has been opened allowing maximum visibility for all operations.

IMPORTANT ASPECT OF THE PRESENT INVENTION RELATIVE TO THIS ENVIRONMENTAL RELATIONSHIP

Each dual wheel drive unit 22 incorporates a reduction gearing arrangement having an input shaft that is adapted to be connected by a drive shaft-universal joint structure 60 to the drive motor 30. As shown in FIGURES 2 and 3, the drive motors 30 are mounted in a central aft portion of the frame 12. Thus, the drive motors 30 have been extended back closer to the steerable rear wheels 18 to permit the narrow vehicle and achieve accessability. The simple opening of grilled doors 62, FIGURE 2, in the heavy thick frame section plates 14, immediately reveals such motors for inspection. Further, each motor 30 is readily accessible for maintenance such as replacement of brushes, etc. Should the brushes require replacement, for example, a universal joint 72, FIGURE 3, at the forward end of the motor 30 is disconnected and the entire motor is pivoted through the inspection door 62, as shown in FIGURE 3. Thus, the removal of a half dozen cap screws permits the motors 30 to be swung outwardly beyond the frame 12 for ready inspection and maintenance.

The pivoted mounting of the drive motors 30 is shown in FIGURE 3. Thus, a mounting plate 64 is mounted on a vertical pivot pin 66. The mounting plate 64 is held in the operating position 68, FIGURE 3, by two cap screws 70. The other four cap screws mentioned, are located in a conventional universal joint, 72, shown schematically in FIGURE 3.

In keeping with the quality engineered into the vehicle forming the environmental background for the present invention, the drive motors 30 are of the high torque traction DC type, series wound with class H insulation. Rugged terminals are provided for external connections. These are coupled to the input shaft of each drive unit 22, which includes a mechanical differential between the wheels of each unit, thereby providing equal driving power to all drive wheels 26 at all times. As shown in FIGURE 3, two drive motors 30 are provided. These are electrically connected in series giving an electrical differential action between the dual wheel drive units 22.

From the foregoing it will be observed that the drive motors 30 are located in a protected position within the frame 12, yet are readily accessible for inspection and maintenance. Brushes, wires or oil level can be quickly checked by opening the motor inspection doors 62. For brush replacement, for example, or for motor 30 removal, it is a simple matter to remove four bolts from the universal joint and the two motor support bolts and swivel the motor out through the inspection door 62.

Advantages will be apparent to the skilled artisan from the foregoing description. I believe that the considerable merits and the greater simplicity of my invention will now be understood and appreciated by those skilled in the art.

I claim:

1. An electric motor driven industrial lift truck, comprising in combination a main frame having sides defined therebetween a space within which is mounted the drive mechanism of said truck, traction wheels mounted at the forward end of said main frame, and steerable wheels at the rear end of said main frame, power transmission means within said space operatively connected to said traction wheels, a pair of motor support brackets within said space, said sides formed with an opening adjacent each bracket, means hinging each motor support bracket on a part of said frame for swinging movement in said space about a pivot axis, an electric motor mounted on each bracket for swinging movement therewith from an inside position within said space, in which inside position said motor is adapted for effective drive assembly to said power transmission means, through an adjacent opening to a position in which said motor is outside of said space, a door adjacent each opening mounted for movement from a closed to an open position to permit each motor to move at least partially through an opening to said outside position, and latch means for holding the door in said closed position.

References Cited

UNITED STATES PATENTS

| | | | |
|---|---|---|---|
| 1,775,754 | 9/1930 | Fageol | 180—54 |
| 1,900,733 | 3/1933 | Staniewicz | 180—64 |
| 1,988,073 | 1/1935 | Fageol | 180—2 |
| 2,373,892 | 6/1945 | Arentzen | 180—54 |
| 2,645,306 | 7/1953 | Turner | 187—9 |

LEO FRIAGLIA, Primary Examiner

MILTON L. SMITH, Assistant Examiner